March 18, 1930.                M. A. GOLDMAN                 1,751,000
                        OIL FILTER AND FILTER ELEMENT
                            Filed June 9, 1928
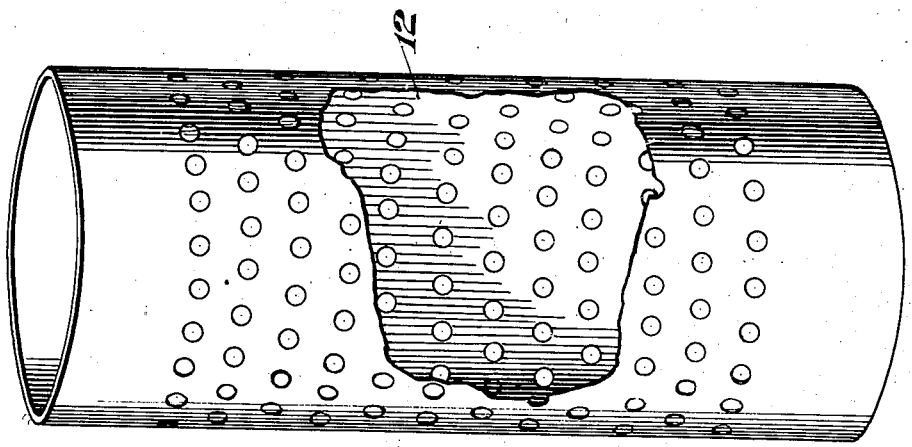
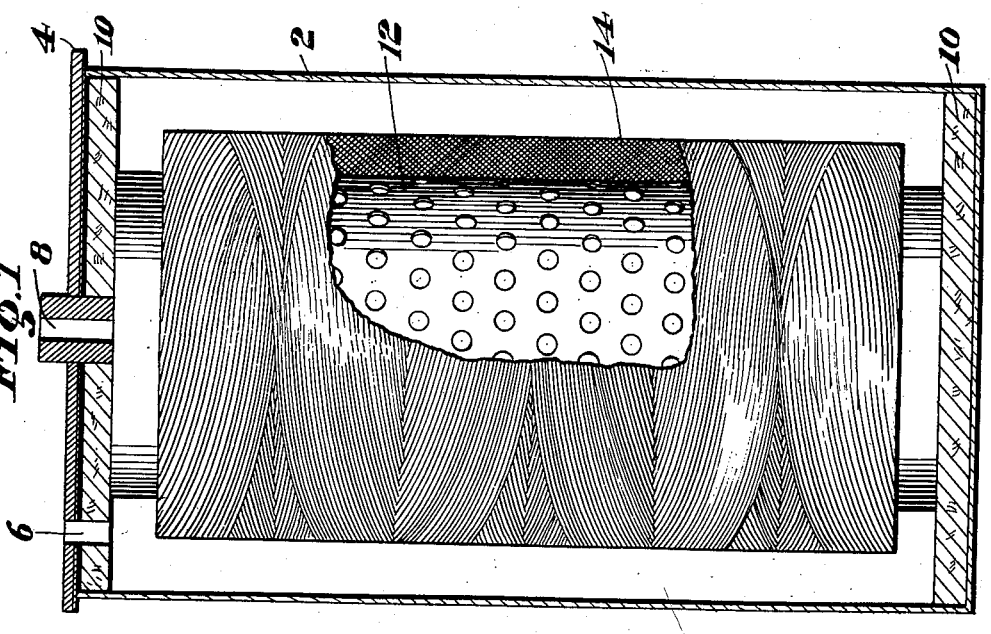
INVENTOR
Maurice A. Goldman
by Guy Cunningham
his attorney Patented Mar. 18, 1930

1,751,000

UNITED STATES PATENT OFFICE

MAURICE A. GOLDMAN, OF MILFORD, NEW HAMPSHIRE, ASSIGNOR TO TUCAPAU MILLS, OF TUCAPAU, SOUTH CAROLINA, A CORPORATION OF SOUTH CAROLINA

OIL FILTER AND FILTER ELEMENT

Application filed June 9, 1928. Serial No. 284,085.

This invention relates to a filter and filter element particularly adapted for the lubricating oil system of an internal combustion engine. It is now common practice to provide lubricating systems of automobile and like engines with a filter which serves to take out particles of solid matter from the oil, such filters in practice usually involving a filtering material consisting of a woven textile fabric. Usually the unfiltered oil is fed into an envelope or cartridge and is forced out through the woven filtering fabric from which it proceeds through the oil circulating system. Such filters operate sufficiently well to give satisfactory service, but my improved filter provides a much greater filtering surface than existing oil filters of the same dimensions now in commercial use, is more efficient, and in addition is simpler and less expensive.

The filter and filter element of this invention consists of a closed metallic casing including therein a filter element and a core or support therefor. The filter element consists of thread wound on a core, as hereinafter described, through which core or form the oil may pass freely. This core, which may be a perforated metal cylinder, or other type of perforate frame, is set and held in the casing into which the oil is fed and forced from outside the filtering element and radially through it into the center zone of the core from which the oil is fed out to the circulating system. This oil can escape from the filter only by passing between and through the threads or yarn wound on the core and out through the outlet into the circulating system. In the drawings, which show one embodiment of my invention, Fig. 1 is a side elevation with the casing in section and with part of the thread broken away for the purpose of giving a view of the perforate cylinder or form on which the thread is wound; and Fig. 2 is a perspective view of the core partly broken away.

Referring to the drawings, 2 represents a metal casing of cylindrical shape, closed at the bottom and having a top 4 removably secured thereto as by threading or screws (not shown), though the manufacturer may prefer to have the top attached to the main part of the casing by electric welding or other permanent hermetical joint. The top 4 is provided with a connection 6 through which oil may be introduced into the casing, and an opening 8 through which a filtered oil may be fed therefrom. The casing 2 is provided at its top and bottom with suitable cork packings 10 (or other sealing means), between which the filter element is held, the core 12 being slightly embedded in the packings 10 when the top 4 is affixed in place. The core 12 carries upon its exterior, coils of thread or yarn 14, which thread, forming the actual filtering medium, may be of any suitable fibrous material wound as hereinafter described to provide interlaced layers of filtering threads upon the perforate core 12, which threads will not separate from each other under the influence of pressure so as to form gaps or voids between the threads through which the oil may pass unfiltered. A very efficient filter is formed by the use of flax and cotton fibres in equal proportions spun together so as to make threads having protruding fibres so as to give the thread a surface which may be called "fuzzy". These threads are preferably wound as described in United States Patent No. 480,158, of Simon W. Wardwell, granted August 2, 1892, though I do not confine myself strictly to such wind. It is simply essential that the thread be so interlaced and reverse with a bend at the ends of the filter element and then cross other turns of the thread so that the coils will not separate and permit the voids before mentioned. A wrapping of a thick cord of braided threads for example, such as has been disclosed in the patented prior art, is subject to this defect and so can not achieve the results of the filter screen disclosed.

I find in practice that a cylindrical core approximately six inches long and 2⅝ inches in diameter wound with a layer of threads about $\frac{5}{16}$ of an inch thick about the core so as to provide about 2⅝ ounces of thread to the core gives a very satisfactory filtering effect. The wind in this case preferably has from 2½ to 4 complete turns of the thread upon the core between reverse bends at the ends of the filter unit. The gainage of the wind should be arranged so that the individual threads are wound separately, that is, there is a small space between each thread and the thread previously laid though strict uniformity is not at all necessary, the point being to provide a network of fuzzy threads which will maintain their positions in use and will be sufficiently separated to permit the passage of the oil and not so much separated as to permit the oil to pass through unfiltered. This, I term loosely wound.

It is my intention to manufacture a perforate form wound with the thread and sell it as a separate article of manufacture to be embodied in an element conforming to my invention but otherwise suited to the varying requirements of the manufacturer of the engine or other device with which it is used. In practice, the filtering element is not renewed in oil filters. The casing is not very expensive and the filter lasts a considerable period of time so that it is considered wiser practice to substitute an entirely new filter, casing and all, rather than to risk the chance of a defective installation of a new filtering element in an old filter or leave the filter to be meddled with by unintelligent users.

Having described my invention, what I wish to claim and secure by Letters Patent is:—

1. A filter of the class described, comprising in combination, a support arranged to permit the passage of liquid; a filtering body sustained by said support and comprising successive layers of fuzzy strands interlaced at intervals and presenting filtering passages between the strands through the intermeshed fuzz thereon; and connections for passing liquid through said filtering body in an inward direction.

2. A filtering element, comprising in combination, a support arranged to permit the passage of liquid; and a filtering body sustained thereby and comprising successive layers of fuzzy strands wound thereon, said strands being interlaced at intervals and presenting filtering passages between the strands and through the intermeshed fuzz thereon.

3. A filtering element comprising an elongated supporting core arranged to permit the passage of liquid; and a generally cylindrical filtering body composed of slender strands wound on said core in criss-cross layers interlaced at intervals, each layer offering minute interstrand passages.

4. An element as defined in claim 3, further characterized by the fact that the strands are composed of a cotton linen yarn.

5. A filter of the class described comprising in combination a support of substantially cylindrical form arranged to permit the passage of a liquid; a filtering body supported thereby and composed of fuzzy strands wound on said core loosely in layers in alternately reverse juxtaposed helical coils which are interlaced at intervals, each layer of strands offering interstrand passages bridged by the fuzz on adjacent strands; and a casing structure having inlet and discharge connections and constraining the flow through said filter to an inward flow relatively to said filtering element.

MAURICE A. GOLDMAN.